United States Patent
Blumenau et al.

(10) Patent No.: US 6,810,396 B1
(45) Date of Patent: Oct. 26, 2004

(54) MANAGED ACCESS OF A BACKUP STORAGE SYSTEM COUPLED TO A NETWORK

(75) Inventors: Steven Blumenau, Holliston, MA (US); Ola Mayer, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/521,902

(22) Filed: Mar. 9, 2000

(51) Int. Cl.[7] .............................................. G06F 17/30
(52) U.S. Cl. ....................... 707/5; 707/162; 709/201; 714/6
(58) Field of Search ..................... 707/5, 162; 709/201, 709/21; 714/6; 711/202; 710/126; 370/392

(56) References Cited

U.S. PATENT DOCUMENTS

| | | | | |
|---|---|---|---|---|
| 5,852,715 A | * | 12/1998 | Raz et al. .................... | 709/201 |
| 5,860,137 A | * | 1/1999 | Raz et al. .................... | 711/202 |
| 5,925,119 A | | 7/1999 | Maroney ..................... | 710/126 |
| 6,000,020 A | | 12/1999 | Chin et al. ................... | 711/162 |
| 6,035,412 A | * | 3/2000 | Tamer et al. .................. | 714/6 |
| 6,081,875 A | | 6/2000 | Clifton et al. .............. | 711/162 |
| 6,205,141 B1 | | 3/2001 | Arroyo ........................ | 370/392 |
| 6,209,023 B1 | | 3/2001 | Dimitroff et al. ........... | 709/211 |
| 6,269,431 B1 | | 7/2001 | Dunham ..................... | 711/162 |
| 6,295,575 B1 | | 9/2001 | Blumenau et al. ............. | 711/5 |
| 2001/0047482 A1 | | 11/2001 | Harris et al. ................ | 713/200 |

\* cited by examiner

*Primary Examiner*—Charles Rones
(74) *Attorney, Agent, or Firm*—Fish & Richardson, PC

(57) ABSTRACT

A data storage is configured to manage access between a backup storage system coupled to a network and hosts connected to the network. The data storage includes a storage device partitioned into a number of volumes for storing data; a first database including first configuration data for identifying which of a number of hosts coupled to the data storage have authorized access to the volumes of the storage device; a backup system having a backup storage device for storing at least a portion of data stored on the storage device; and a second database including second configuration data for identifying which of the hosts have access to the backup storage, device.

20 Claims, 2 Drawing Sheets

MANAGED ACCESS OF A BACKUP STORAGE SYSTEM COUPLED TO A NETWORK

BACKGROUND OF THE INVENTION

This invention relates generally to the field of information storage devices and more particularly to a method and apparatus for managing access to data stored in a backup storage device.

Computer systems generally include one or more host processors and a storage system for storing data accessed by the host processor. The storage system may include one or more storage devices (e.g., disk drives, tape drives) to service the storage needs of the host processor. The disk drives and tape drives include a recording media, such as a magnetic recording medium or an optical recording medium.

A computer system may also include a backup storage, separate from data storage, for storing backup copies of data that may be needed to restore lost or damaged programs and files. Because backup storage is used far less than the regular data storage, slower, but large (e.g., >1 terabit), tape libraries are generally used, for example, as an archival storage.

Using a network (e.g., a Fibre channel network), multiple hosts are able to share access to a single storage system. One problem with coupling multiple hosts to a shared storage system is the management of data access at the storage system. Because multiple hosts have access to the common storage system, each host may physically be able to access information that may be proprietary to the other host processors. Various techniques have been implemented to manage access to data at the storage system. For example, certain portions or zones of memory at the storage system may be dedicated to one or more of the hosts. Each host is "trusted" to access only those portions of memory for which it has privileges. However, such an approach is vulnerable to the individual actions of each of the hosts. As a result, such a data management method may not be sufficient to protect data from unprivileged accesses. The problem of data management extends as well to the backup storage. In particular, it may be desirable to limit access to certain portions of the backup storage to particular ones of the multiple hosts connected to the network.

SUMMARY OF THE INVENTION

The invention features a data storage configured to manage access between a backup storage system coupled to a network and hosts connected to the network.

In one aspect of the invention, the data storage includes a storage device partitioned into a number of volumes for storing data; a first database including first configuration data for identifying which of a number of hosts coupled to the data storage have authorized access to the volumes of the storage device; a backup system having a backup storage device for storing at least a portion of data stored on the storage device; and a second database including second configuration data for identifying which of the hosts have access to the backup storage device.

Among other advantages, the second database serves as a separate and independent database for identifying to the backup system those hosts that it is able to communicate with. Thus, access to the backup storage can be managed to prevent access by unauthorized host computers. In this way, security is increased and the risk of overwriting of the backup storage is virtually eliminated. Moreover, the primary data storage (i.e., non-backup storage) is managed separately using the first database without fear of corruption from the external backup storage. This feature is particularly advantageous in applications where the data storage is fully partitioned for use with the hosts and does not require modification to accommodate use with the external backup storage.

Embodiments of this aspect of the invention may include one or more of the following features.

The storage device, the first database, and the second database are part of an enterprise data storage system. Although the external backup storage is configured such that it plays no role in managing the primary data storage, the opposite is not true. By including the second database with the first database and its associated storage device, the data storage and backup storage are both centrally managed. Thus, a particular host computer (e.g., acting as a management console) has access to both the first and second databases. In this way, the particular host can be used to remotely establish the accessibility of the other hosts to both the data storage and backup storage.

In a particular embodiment, the data storage includes a first adapter, responsive to the first configuration data, which selectively forwards to the storage device, requests from the hosts, for access to the volumes. The data storage also includes a second adapter, responsive to the second configuration data, which similarly and selectively forwards to the backup system, requests from the hosts, for access to the backup storage device. The first and second adapters serve as bridges or directors for the various volumes (e.g., disk drives) in the storage device and the various backup storage devices (e.g., tape libraries) of the backup storage, respectively.

The first configuration data is stored in a configuration table including records, each of the records having an identifier and information indicating which of the volumes are available to a host associated with the corresponding identifier. The request includes a source identifier identifying the host that initiated the request and an address to one of the plurality of volumes in the storage system.

In one application, the hosts are coupled to the data storage by a Fibre Channel network with a request for access by one of the hosts being in a Fibre Channel protocol. On the other hand, the backup storage operates under a SCSI protocol. For example, the backup storage is a legacy device, such as a tape storage drive having a number of tape libraries. In this case, the second adapter serves as a translator to convert data passing between the backup tape storage (under SCSI protocol) and the data storage (under Fibre Channel protocol).

With this arrangement, tape storage units and other legacy devices of the type whose resources are fixed and cannot be dynamically configured can be coupled to a network supported by a different protocol, such as Fibre Channel. For example, in one network architecture, an enterprise data storage system includes a number of shared storage devices (e.g., disk drives) accessible by a number of different host computers through a Fibre Channel network. The second adapter allows the tape storage, as well as other legacy operating using a different older protocol (e.g., SCSI) to be connected to the Fibre Channel network.

Another aspect of the invention is directed to a method for managing access hosts and a backup system, which is part of a data storage including a data storage device partitioned into volumes and a first database. The first database is used by the hosts to determine which hosts have authorized access to the volumes. The method includes the following steps. A request from one of the hosts for accessing data stored on the backup system is received by the data storage. In response to configuration data, the host requesting access is authorized to access the portion of data stored on the backup system. Determining whether to service the request is performed in response to a portion of the configuration data associated with the source identifier and the address of the one of the backup storage devices.

In applications where the hosts, data storage, and backup system are coupled by a Fibre Channel network, the method further includes forwarding the request using a Fibre Channel protocol for access to a portion of data stored on the backup system over the Fibre Channel network.

Other advantages and features will become apparent from the following description and from the claims.

DETAILED DESCRIPTION

Figure 1:
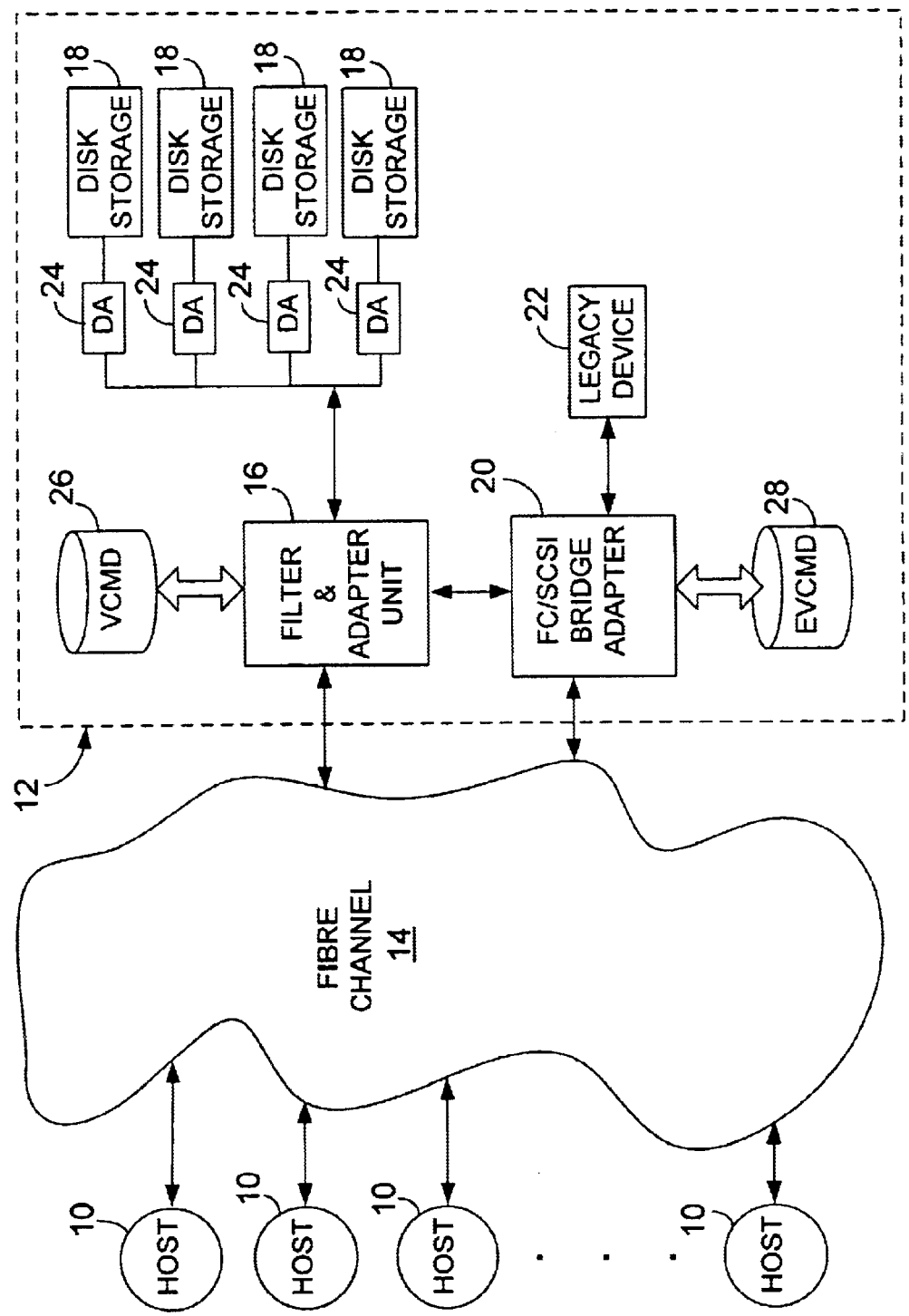
FIG. 1 is a block diagram of a storage system coupled to host computers via a fibre channel network.

Referring to FIG. 1, a number of host computers 10 are coupled to an enterprise storage system 12 through a communications network, here a Fibre Channel network 14. The term "enterprise" as used here means that the storage system is configured to allow multiple connectivity by, for example, hosts provided by different vendors. As will be described below, such storage systems typically include many large disk drive units controlled by a complex, multi-tasking, disk drive controller such as the EMC Symmetrix disk drive controller, a product of EMC Corporation, Hopkinton, Mass.

Figure 2:
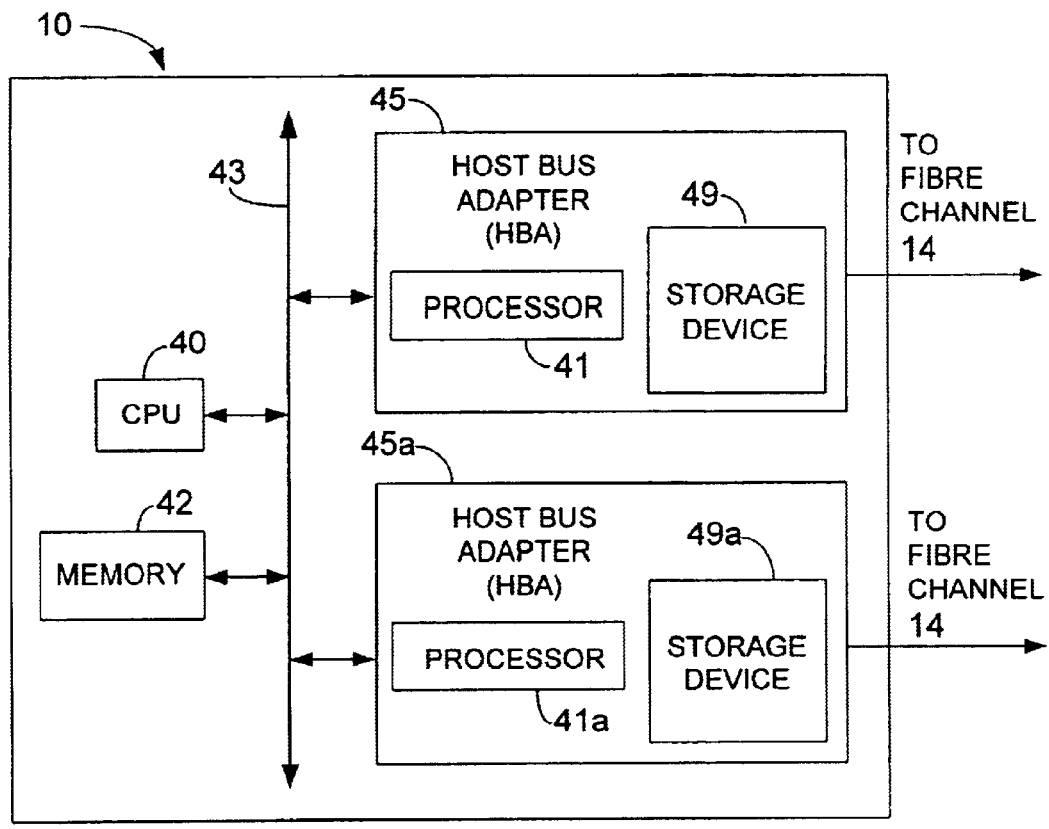
FIG. 2 is a block diagram of a representative one of the host computers of FIG. 1.

Referring to FIG. 2, each host computer 10 represents a host processor, file server or similar device which stores and retrieves data to and from storage system 12. Host computer 10 includes a central processing unit (CPU) 40 coupled by a local bus 43 to a memory 42. A pair of host bus adapters (HBAs) 45, 45a are used to couple bus 43 to Fibre Channel network 14. HBAs 45, 45a translate data received from CPU 40 into a format dictated by the protocol of network 14. In addition, HBAs 45, 45a translate data received from network 14 into data in a packet format usable by CPU 40. Each HBA 45, 45a is implemented using a combination of hardware resident on the HBA and driver software stored in the HBA or in memory 42. Alternatively, HBA may be implemented either entirely in hardware or software.

In this embodiment, HBA 45 includes a processor 41 coupled to a storage device 49. Processor 41 controls the flow and format of data into and out of HBA 45. Storage device 49 is used to provide temporary storage of data as it is transferred to and from network 14. HBA 45 generates packets for transmission over network 14, with each packet including a source ID field identifying the particular HBA. Because multiple HBAs may be included at each host, multiple source IDs may be associated with the same host.

Referring again to FIG. 1, enterprise storage system 12 includes a filter and adapter unit 16 and a number of shared storage volumes, here represented by disk storage devices 18. Filter and adapter unit 16 includes volume configuration management (VCM) software 17 called Volume Logix, a product of EMC Corporation, Hopkinton, Mass. to control access to the disk storage devices 18.

Access to storage devices 18, which may include one or more disks, is controlled through the use of disk adapters 24 implemented using a programmed processor or custom hardware design. In the embodiment shown in FIG. 1, a disk adapter 24 is provided for each storage device 18, although in alternative embodiments, a disk adapter may be coupled to more than one storage device. In addition, disk adapters 24 may include secondary connections to storage devices 18 of another disk adapter to permit recovery from failure of one disk adapter by shifting its functions to the second disk adapter.

Each storage device 18 is apportioned into volume sets, each volume set capable of storing in excess of several gigabits of data, and in turn, made available to one or more of the HBAs 45, 45a. In one embodiment, references to the volumes in storage devices 18 by HBAs 45, 45a are performed using logical unit numbers (LUNs). Note, however, that there need not be a one to one correspondence between the logical unit numbers provided by hosts and the physical addresses of disk devices 18.

As will be described in greater detail below, ,enterprise data storage 12 uses a backup storage system, here a tape storage 22 having multiple tape libraries 23 to periodically store data from storage devices 18. Tape storage 22 interfaces with data storage 12 through a bridge adapter 20, for controlling access to the tape storage.

Figure 3:
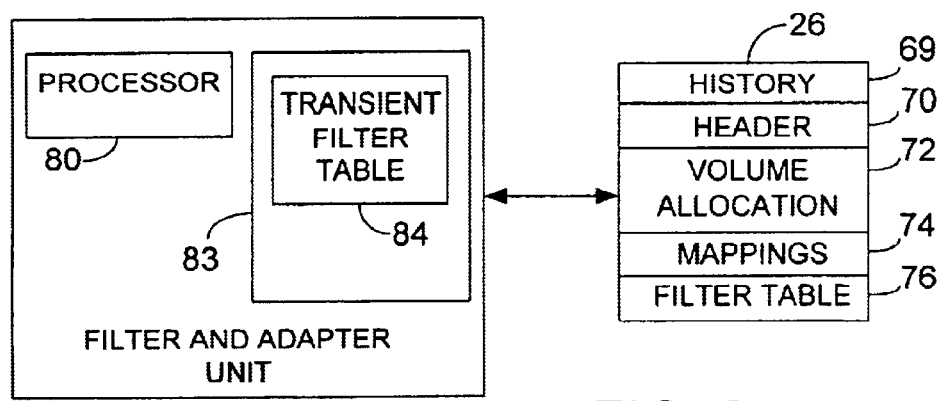
FIG. 3 is a block diagram of the filter/adapter unit and volume control management database of FIG. 1.

Referring to FIG. 3, filter/adapter unit 16 uses a volume configuration management database (VCMD) 26 to store information for determining which ones of the HBAs of host computers 10 have access to corresponding ones of the volumes of storage devices 18. In one embodiment, information in VCMD 26 is received from the system administrator (via, for example, a management console), and is periodically updated as the configuration of network 14 changes. The VCMD 26 includes a list of configuration/database volumes on storage system 12 referred to as the control volume registry (CVR).

One example of the type of data stored in configuration database 26 is a history table 69, which is apportioned into one block for each of the ports of disk storage devices 18. Each block in history table 69 includes a list of those hosts 10 that have queried the port as they enter network 14. The identification information for each host may include the worldwide name (WWN) of the host, the source ID of the host, or other aliases of the host. This identification information may be used when the host logs into storage system 12 to match an identifier of the host with configuration data for the host.

The configuration database 26 also includes a header portion 70 for mapping the HBAs to the available ports at storage devices 18. A volume allocation portion 72 is provided for allocating logical volumes of data at the storage devices to different HBAs. A mapping portion 74 is provided for mapping LUNs to physical addresses of the storage devices. In addition, a filter table 76 is provided for determining which HBAs have access to which of the LUNs. Filter table 76 is generated using the volume allocation and mapping information and includes a record for each HBA coupled to any of the ports of the storage system. Each record within filter table 76 includes the WWN associated with the HBA, a flag indicating whether the volumes allocated in this entry are shared, and an LUN map identifying which of the logical volumes the HBA may access. In one embodiment, the LUN map is in the form of a bitmask with one bit allocated to each LUN in the storage system. In such an embodiment, a bit in the bitmask is set to indicate that the associated HBA indicated by the WWN has access to the corresponding LUN, although alternatively the bit may be cleared to indicate access. In addition, alternative embodiments where the available LUNs are indicated differently may also be used.

In operation, filter/adapter unit 16 translates packets received from network 14 into data blocks for forwarding to disk adapters 24. In addition, filter/adapter unit 16 performs a filtering function to ensure that only those HBAs with privileges are able to access the volumes of storage devices 18. Thus, rather than trusting that the HBAs will only access those volumes which they have been assigned, filter/adapter unit 16 controls accesses to storage devices 18 by filtering out non-privileged requests.

Filter/adapter unit 16 includes a processor 80 coupled to a memory 83. The processor is used to control the transmission and translation of data between storage system 12 and network 14. Memory 83 is used to store a transient filter table 84, which is apportioned into a number of tables, one for each port of the storage system. Each time an HBA initiates a connection with storage system 12 over one of its ports, filtering information is copied from the filter table 76 in configuration management database 26 to the appropriate entry in the transient filter table 84. The filtering information may include the source ID of the HBA logged into the port, a flag indicating whether the volumes associated with this entry are shared, and a LUN map for the HBA logged into the port, where the LUN map is copied from the filter table 76 in the configuration database.

In one embodiment, the configuration data in the transient filter table 84 is accessed for each request. The address of the request is provided in Bus/Target/LUN format, where the Bus portion indicates the Fibre Channel network address of storage system 12, the Target portion indicates the storage system port address, and the LUN represents the volume address of the request. The address is compared with the entry in the transient filter table 84 which includes the LUN map associated with the HBA. If the bit in the LUN map associated with the addressed LUN indicates that the HBA has access to the LUN, the request is forwarded to disk adapters 24 for servicing. If not, the request is ignored. The size of the transient filter table 84 is related to the number of ports provided at the storage system, the number of HBAs supported at each port and the number of LUNs in the storage system. In one exemplary configuration of storage system 12, sixteen ports are used to access 4096 LUNs, with each port capable of supporting accesses by thirty two different HBAs. Thus, when transient filter table 84 is large, if it was stored in a single large memory, the access time for each I/O request may be long. Thus, to increase the response time performance of storage system 12, transient filter table 84 is arranged to allow for quick retrieval of the access information for each HBA. Further details of the operation of filter and adapter unit 16 and VCMD 26 for managing access of host computers 10 to storage devices 18 is found in co-pending application, Ser. No. 09/107,918, entitled "Method and Apparatus for Providing Data Management for a Storage System Coupled to a Network," filed Jun. 30, 1998, which is assigned to the assignee of the present invention, and is incorporated herein by reference.

Referring again to FIG. 1, as discussed above, a primary function of filter/adapter unit 16 is to manage access of host computers 10 to storage devices 18. Bridge adapter 20 similarly manages access between host computers 10 and tape storage 22. In addition bridge adapter 20 acts as a director for the different tape libraries 23 in tape storage 22 in the same way that the disk controller acts as a director for the various volumes of the enterprise data storage 12.

In many applications, tape storage 22 is operating under a SCSI protocol. In such applications, in addition to managing access to legacy device 22, bridge adapter 20 serves as a translator or converter of data received from Fibre Channel network 14 into SCSI format. Because such legacy devices were developed long before the introduction of fibre channel, they generally do not support fibre channel and cannot be dynamically configured to do so. Bridge adapter 20 allows such devices to be integrated within more sophisticated storage networks, such as an enterprise storage array network.

Bridge adapter 20 operates in conjunction with the VCM software 17 of filter and adapter unit 16. Specifically, the VCM software 17 must be extended to support bridge adapter management of tape storage 22. First, VCM software 17 is used to create an external volume configuration management database (EVCMD) 28, which stores information for determining which ones of host computers 10 have access to tape storage 22. EVCMD 28 is independent from VCMD 26 and uniquely associated with bridge adapter 20. Information in EVCMD 28 is received from the system administrator and is periodically updated as the configuration of network 14 changes. In certain embodiments, more than one bridge adapter may be provided. In this case, a separate EVCMD is assigned via a worldwide name (WWN) to each bridge adapter. The WWN is stored in an identifier field within the control volume registry (CVD). In this arrangement, VCM software 17 determines whether the WWN is correct; if not, an error is issued.

In operation, when a host requires access to tape storage 22, VCM software 17 locates and searches within the control volume registry for an EVCMD entry. Bridge adapter 20 searches the topology of storage system 12 for storage devices 18. Specifically, bridge adapter 20 checks storage system 20 for VCMD 26 and appended control volume registry. Bridge adapter 20 checks the volume control registry for an entry for the WWN of the bridge adapter. The list entry will point to the appropriate EVCMD volume and determine whether access is allowed. If access is not allowed, an error message is returned to the requesting host.

Other embodiments are within the scope of the claims. For example, although the above discussion relates to a network architecture where a host gains access to data at a storage system, the above described methods may be applied to any system where a resource is shared by multiple devices. Such systems include, but are not limited to any type of storage system including disk devices, tape devices, tile servers and the like.

It is important to appreciate that Fibre Channel network 14 may be arranged in any of a number of different configurations for coupling devices. For example, the Fibre Channel network may be configured as a loop, a fabric having a hub serving as a switch, or combinations of both. However, it is also important to note that in the above embodiment, the backup system was represented by a tape storage, the invention is applicable as well to other parallel SCSI devices including CD-ROMs and scanners.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A data storage system comprising:
   a primary storage device partitioned into a plurality of volumes for storing data;
   a first database including first configuration data for identifying which of a plurality of hosts coupled to the data storage system have authorized access to selected volumes of the primary storage device;
   a backup system having a backup storage device for storing at least a portion of data stored on the primary storage device; and
   a second database including second configuration data for identifying which of the plurality of hosts coupled to the data storage system have access to the backup storage device, the second configuration data being independent of the first configuration data.

2. The data storage system of claim 1, wherein the primary storage device, the first database, and the second database are part of an enterprise data storage system.

3. The data storage system of claim 2, further comprising a first adapter, the first adapter being configured to selectively forward to the primary storage device, in response to the first configuration data, requests from the plurality of hosts for access to the plurality of volumes.

4. The data storage system of claim 3, further comprising a second adapter, the second adapter being configured to selectively forward, in response to the second configuration data, requests from the plurality of hosts for access to the backup storage device.

5. The data storage system of claim 3, wherein the first configuration data is stored in a configuration table including a plurality of records, each of the records having an identifier and information indicating which of the volumes are available to a host associated with the corresponding identifier, and wherein the request includes a source identifier identifying the host that initiated the request and an address to one of the plurality of volumes in the storage system.

6. The data storage system of claim 1, wherein the hosts are coupled to the data storage system by a Fibre Channel network, a request for access by one of the plurality of hosts being in a Fibre Channel protocol.

7. The data storage system of claim 1, wherein the backup storage device operates under a SCSI protocol.

8. The data storage system of claim 7, wherein the backup storage device comprises a tape storage drive.

9. A method for managing access between a plurality of hosts and a backup system, the backup system being part of a data storage system including a data storage device partitioned into a plurality of volumes, and a first database having first configuration data used by the hosts to determine which hosts have authorized access to the volumes, the method comprising:
   receiving, by the data storage system, a request from a host for access to data stored on the backup system;
   retrieving, from a second database, second configuration data for identifying which hosts have access to the backup storage device, the second configuration data being independent of the first configuration data, and
   determining, in response to the second configuration data, that the host requesting access is authorized to access the portion of data stored on the backup system.

10. The method of claim 9, wherein the backup system includes a plurality of backup storage devices and the second configuration data is stored in a configuration table including a plurality of records, each of the records having an identifier and information indicating which of the backup storage devices are available to a host associated with the corresponding identifier, and wherein the request includes a source identifier identifying the host that initiated the request and an address to one of the backup storage devices; the method further comprising;
   determining whether to service the request responsive to a portion of the second configuration data associated with the source identifier and the address of the one of the backup storage devices.

11. The method of claim 9, wherein the hosts, data storage system and backup system are coupled by a Fibre Channel network, the method further including forwarding the request using a Fibre Channel protocol for access to a portion of data stored on the backup system over the Fibre Channel network.

12. The method of claim 9, wherein the backup system operates under a SCSI protocol.

13. The method of claim 12, wherein the backup system comprises tape storage unit and the backup storage devices include tape libraries.

14. A method for managing a data storage system, the method comprising:
   partitioning a primary storage device into a plurality of volumes for storing data;
   including, in a first database, first configuration data for identifying which of a plurality of hosts coupled to the data storage system have authorized access to selected volumes of the storage device;
   providing a backup system having a backup storage device for storing at least a portion of data stored on the primary storage device; and
   including, in a second database, second configuration data for identifying which of the plurality of hosts coupled to data storage system have access to the backup storage device, the second configuration data being independent of the first configuration data.

15. The method of claim 14, further comprising selecting the primary storage device, the first database, and the second database to be part of an enterprise data storage system.

16. The method of claim 15, further comprising configuring a first adapter to selectively forward, to the primary storage device, in response to the first configuration data, requests from the plurality of hosts for access to the plurality of volumes.

17. The method of claim 16, further comprising configuring a second adapter to selectively forward, in response to the second configuration data, requests from the plurality of hosts for access to the backup storage device.

18. The method of claim 16, further comprising:
   storing the first configuration data in a configuration table including a plurality of records, each of the records having an identifier and information indicating which of the volumes are available to a host associated with the corresponding identifier, and
   including, in the the request, a source identifier identifying the host that initiated the request and an address to one of the plurality of volumes in the store system.

19. The method of claim 14, further comprising coupling the hosts to the data storage system by a Fibre Channel network, and causing a request for access by one of the plurality of hosts to be in a Fibre Channel protocol.

20. The method of claim 14, further comprising operating the backup storage device under a SCSI protocol.

* * * * *